US009180617B2

(12) United States Patent
Tsai et al.

(10) Patent No.: US 9,180,617 B2
(45) Date of Patent: Nov. 10, 2015

(54) PLASTIC PRODUCT MANUFACTURING METHOD AND ALL-ELECTRIC INJECTION-MOLDING MACHINE

(71) Applicant: DELTA ELECTRONICS, INC., Taoyuan Hsien (TW)

(72) Inventors: Ching-Hsiung Tsai, Taoyuan Hsien (TW); Yun-Feng Shiu, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 409 days.

(21) Appl. No.: 13/772,353

(22) Filed: Feb. 21, 2013

(65) Prior Publication Data

US 2013/0345855 A1 Dec. 26, 2013

(30) Foreign Application Priority Data

Jun. 25, 2012 (TW) .............................. 101122571 A (51) Int. Cl.
*G06F 19/00* (2011.01)
*B29C 45/76* (2006.01)
*B29C 45/66* (2006.01)

(52) U.S. Cl.
CPC ........... *B29C 45/7666* (2013.01); *B29C 45/766* (2013.01); *B29C 45/66* (2013.01); *B29C 2945/76946* (2013.01); *B29C 2945/76993* (2013.01)

(58) Field of Classification Search
USPC .............. 700/200, 97, 203, 202; 264/54, 645, 264/513
See application file for complete search history.

(56) References Cited

U.S. PATENT DOCUMENTS

| 5,035,598 | A | 7/1991 | Fujita et al. |
| 5,900,259 | A | 5/1999 | Miyoshi et al. |
| 6,311,101 | B1 * | 10/2001 | Kastner .......................... 700/197 |
| 6,675,055 | B1 * | 1/2004 | Fischer ............................ 700/97 |
| 6,980,882 | B2 * | 12/2005 | Yamazaki et al. ............. 700/200 |
| 7,031,800 | B2 * | 4/2006 | Bulgrin .......................... 700/200 |
| 7,580,771 | B2 * | 8/2009 | Quail et al. .................... 700/197 |

(Continued)

FOREIGN PATENT DOCUMENTS

| CN | 1141232 A | 1/1997 |
| CN | 101044004 A | 9/2007 |
| EP | 0747198 A2 | 12/1996 |

(Continued)

*Primary Examiner* — Kidest Bahta
(74) *Attorney, Agent, or Firm* — CKC & Partners Co., Ltd.

(57) ABSTRACT

A plastic product manufacturing method includes (a) providing a cloud server which stores a machine number and machine parameters of an all-electric injection-molding machine that includes a controller; (b) downloading the machine parameters from the cloud server according to the machine number; (c) executing mold flow analysis software to generate model data and optimal injection conditions of a mold according to the machine parameters; (d) setting a mold number and a password to the model data and the optimal injection conditions and then storing the same in the cloud server after packaging; (e) connecting to the cloud server using the machine number, the mold number, and the password by the controller; (f) downloading the optimal injection conditions to the controller after the cloud server confirms the machine number, the mold number, and the password; and (g) driving the all-electric injection-molding machine by the controller according to the optimal injection conditions.

10 Claims, 5 Drawing Sheets

(56) References Cited

U.S. PATENT DOCUMENTS

| | | |
|---|---|---|
| 2001/0051858 A1 | 12/2001 | Liang et al. |
| 2002/0026264 A1* | 2/2002 | Choi .............................. 700/197 |
| 2006/0082009 A1* | 4/2006 | Quail et al. .................. 264/40.1 |
| 2006/0082010 A1* | 4/2006 | Saggese et al. .............. 264/40.5 |
| 2010/0161108 A1 | 6/2010 | Yeager et al. |
| 2013/0265315 A1* | 10/2013 | McGreevy et al. ........... 345/440 |

FOREIGN PATENT DOCUMENTS

| | | |
|---|---|---|
| TW | 584591 B | 4/2004 |
| TW | 200540006 A | 12/2005 |
| WO | 02/10993 A2 | 2/2002 |

\* cited by examiner

PLASTIC PRODUCT MANUFACTURING METHOD AND ALL-ELECTRIC INJECTION-MOLDING MACHINE

RELATED APPLICATIONS

This application claims priority to Taiwan Application Serial Number 101122571, filed Jun. 25, 2012, which is herein incorporated by reference.

BACKGROUND

1. Technical Field

The present disclosure relates to a plastic product manufacturing method and an all-electric injection-molding machine.

2. Description of Related Art

In recent years, with the increase in environmental awareness, there have been significant changes with respect to industrial equipment. An obvious example of this is processing equipment in the plastic molding industry, which has undergone a change from general hydraulic equipment to electric equipment with environmentally friendly aspects. As the name suggests, the power system of an all-electric injection-molding machine is driven by electric motors. That is, conventional hydraulic cylinders or pneumatic cylinders are replaced by servo motors or induction motors.

An all-electric injection-molding machine is fast, accurate, stable, quiet, energy saving, and clean, and so has been revolutionary in the area of plastic injection molding machines. All-electric injection-molding machines can be applied in various different fields, such as those related to consumer products and industrial supply products (e.g., silicone products, polyethylene terephthalate containers, vehicle parts, cosmetics containers, domestic containers, precision gears, etc.), as well as those related to precision injection products (e.g., semiconductor components, information and computer products, optical lenses, liquid crystal display light guide plates, integrated circuit cards, electronic material components, etc.). All-electric injection-molding machines also provide great benefits with respect to advanced micro-injection molding technology in the fields of biochemistry, medicine, microelectromechanical systems (MEMS), information technology (IT), optoelectronics, precision measurement components, etc.

In general, all-electric injection-molding machines involve central control (i.e., a high-level controller processes all procedures and gives orders to low-level drivers and motors). The infrastructure of an all-electric injection-molding machine is similar to that of a traditional hydraulic injection-molding machine. However, pressure and speed control of an all-electric injection-molding machine during an injection stage and a material storage stage need immediate feedback control. Moreover, the response to requests of an all-electric injection-molding machine is faster than in a hydraulic system. In addition to numerical display of a human-machine interface, the high-level controller of an all-electric injection-molding machine also includes procedure control, and squeezing speed control and command tracking control of pressure in each process. For example, the flowing speed and generated pressure of a melt plastic substance change rapidly, and so real-time computing capability of a high-level controller must be quite fast. Under such circumstances, the operation interval of a high-level controller cannot be very short, otherwise the injection quality of the overall system cannot be raised. In order to get a good injection product, it is necessary to rely on experienced technicians who spend a lot of time adjusting injection conditions of speed and pressure. Some academics have suggested the Taguchi method to get the best conditions. Therefore, use of an all-electric injection-molding machine entails significant technician involvement and material costs.

SUMMARY

In order to solve the problems of the prior art, the disclosure provides an improved plastic product manufacturing method. The plastic product manufacturing method integrates expert system architectures in upstream and downstream ends (such as machinery factories, product designing plants, mold flow analysis software plants, etc.) by using a cloud server, so as to integrate the best manufacturing solution of a plastic product in the cloud. Furthermore, a controller of an all-electric injection-molding machine can obtain the best manufacturing solution of a plastic product from the cloud server. Therefore, the schedule of the all-electric injection-molding machine can be reduced, and experience of setting and adjusting the machine can be systematically stored and utilized. As a result, the loss of experienced technicians does not adversely affect manufacture, and the quality of the plastic product can be optimized.

According to an embodiment of the disclosure, a plastic product manufacturing method includes (a) providing a cloud server, in which the cloud server stores a machine number and machine parameters related to an all-electric injection-molding machine, and the all-electric injection-molding machine includes a controller; (b) downloading the machine parameters from the cloud server according to the machine number; (c) executing mold flow analysis software to generate a set of model data and optimal injection conditions related to a mold according to the machine parameters; (d) setting a mold number and a password to the set of model data and the optimal injection conditions and then storing the mold number and the password in the cloud server after packaging; (e) connecting to the cloud server using the machine number, the mold number, and the password by the controller after receiving a production requirement; (f) downloading the optimal injection conditions to the controller after the cloud server confirms the machine number, the mold number, and the password; and (g) driving the all-electric injection-molding machine by the controller according to the optimal injection conditions, so as to injection mold a plastic substance into a plastic product.

In an embodiment of the disclosure, the all-electric injection-molding machine includes a plurality of shafts and a plurality of drivers, and step (g) includes (g1) making the drivers generate a plurality of speed-command curves according to the optimal injection conditions; and (g2) making each of the drivers to drive the corresponding shaft according to the corresponding speed-command curve by the controller, so as to injection mold the plastic substance into the plastic product by the mold.

In an embodiment of the disclosure, when the drivers drive the shafts according to the speed-command curves, each of the shafts has a corresponding practical speed curve. The plastic product manufacturing method further includes (h) determining whether a quality situation of the plastic product meets a defective product situation, and if it does, performing step (i); and (i) returning the quality situation and the practical speed curves to the cloud server.

In an embodiment of the disclosure, the machine parameters include a machine tonnage parameter, an injection tube parameter, and a screw cross-sectional area parameter.

In an embodiment of the disclosure, the set of model data include a mold drawing parameter and a sprue parameter.

In an embodiment of the disclosure, the optimal injection conditions include an optimal temperature value, an optimal injection speed value, and an optimal pressure value.

The disclosure further provides an improved all-electric injection-moldingmachine. A controller of the all-electric injection-molding machine is only responsible for implementations of human-machine interface and program logic (PL). After a mold and speed-command curves have been determined, the controller transmits the speed-command curves to low-level drivers. in each stage, the controller only transmits starting commands corresponding to the stage to the drivers, and then the drivers operate according to the transmitted speed-command curves respectively. The controller only monitors whether all protection switches are triggered to determine follow-up actions, and monitors whether the drivers have accomplished tasks of a current stage to determine the starting of the next stage. After receiving the corresponding speed-command curve, each of the drivers drives the corresponding shaft and returns a system state back to the controller. Accordingly, the all-electric injection-molding machine of the disclosure can achieve a decentralized control architecture, thus reducing the burden on the controller.

According to an embodiment of the disclosure, an all-electric injection-molding machine cooperates with a cloud serve and is used to inject a plastic substance into a mold. The all-electric injection molding machine includes a clamping shaft, a cylinder body, a screw, an injection shaft, a material storage shaft, a controller, a first driver, a second driver, and a third driver. The clamping shaft is operatively connected to the mold and is used for opening or closing the mold. The cylinder body is communicated with the mold and is used for accommodating the plastic substance. The screw is slidably and rotatably disposed in the cylinder body. The injection shaft is operatively connected to the screw and is used for driving the screw to slide relative to the cylinder body. The material storage shaft is operatively connected to the screw and is used for driving the screw to rotate relative to the cylinder body. The controller is used for downloading optimal injection conditions from the cloud server according to a machine number related to the all-electric injection-molding machine, a mold number related to the mold, and a password. The first driver is used for generating an opening mold speed-command curve and a closing mold speed-command curve according to the optimal injection conditions. The first driver is capable of driving the clamping shaft to open and close the mold respectively according to the opening mold speed-command curve and the closing mold speed-command curve. The second driver is used for generating an injection speed-command curve and a storing material speed-command curve according to the optimal injection conditions. The second driver is capable of driving the injection shaft to move the screw toward the mold so as to inject the plastic substance into the mold according to the injection speed-command curve at an injection stage, and driving the injection shaft to move the screw away from the mold according to the storing material speed-command curve at a material storage stage. The third driver is used for driving the material storage shaft to actuate the screw to push the plastic substance outside of the cylinder body into the cylinder body at the material storage stage.

In an embodiment of the disclosure, the first driver includes a first command-smoothing unit and a first driving unit, The first command-smoothing unit is used for smoothing the injection speed-command curve and the closing mold speed-command curve. The first driving unit is used for driving the clamping shaft to close and open the mold respectively according to the smoothed opening mold speed-command curve and the smoothed closing mold speed-command curve.

In an embodiment of the disclosure, the second driver includes a second command-smoothing unit and a second driving unit. The second command-smoothing unit is used for smoothing the opening mold speed-command curve and the storing material speed-command curve. The second driving unit is used for driving the injection shaft to move the screw toward the mold according to the smoothed injection speed-command curve, and driving the injection shaft to move the screw away from the mold according to the smoothed storing material speed-command curve.

In an embodiment of the disclosure, the controller further downloads a backpressure command curve from the cloud server. The screw has a corresponding backpressure limitation value at any position relative to the mold according to the backpressure command curve. The all-electric injection-molding machine further includes a pressure sensor. The pressure sensor is operatively connected to the screw and is used for sensing an actual backpressure value related to the screw. The second driver drives the injection shaft to move the screw toward the mold according to the injection speed-command curve and the backpressure command curve when the actual backpressure value is larger than the backpressure limitation value, and drives the injection shaft to move the screw away from the mold according to the storing material speed-command curve and the backpressure command curve, It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
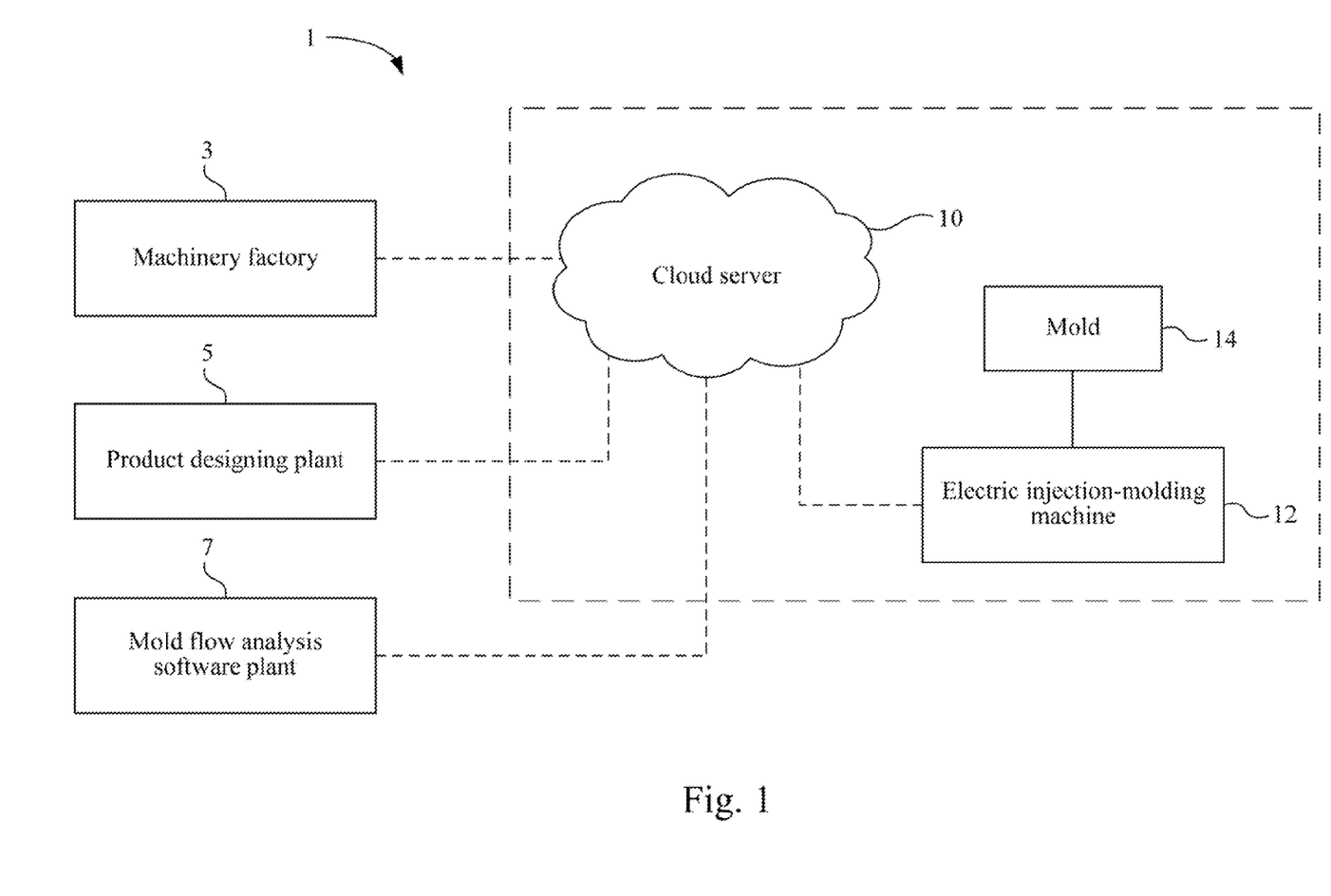
FIG. 1 is a block diagram of a plastic product manufacturing system according to an embodiment of the disclosure.

FIG. 1 is a block diagram of a plastic product manufacturing system 1 according to an embodiment of the disclosure.

The plastic product manufacturing system 1 of the disclosure is used to manufacture a plastic product. As shown in FIG. 1, the plastic product manufacturing system 1 includes a cloud server 10, a mold 14, and an all-electric injection-molding machine 12. The plastic product manufacturing system 1 of the disclosure can cooperate with a machinery factory 3, a product designing plant 5, and a mold flow analysis software plant 7. Internal modules in the plastic product manufacturing system 1 of the disclosure, and operating relationships among the plastic product manufacturing system 1, the machinery factory 3, the product designing plant 5, and the mold flow analysis software plant 7 are introduced in detail below.

Figure 2:
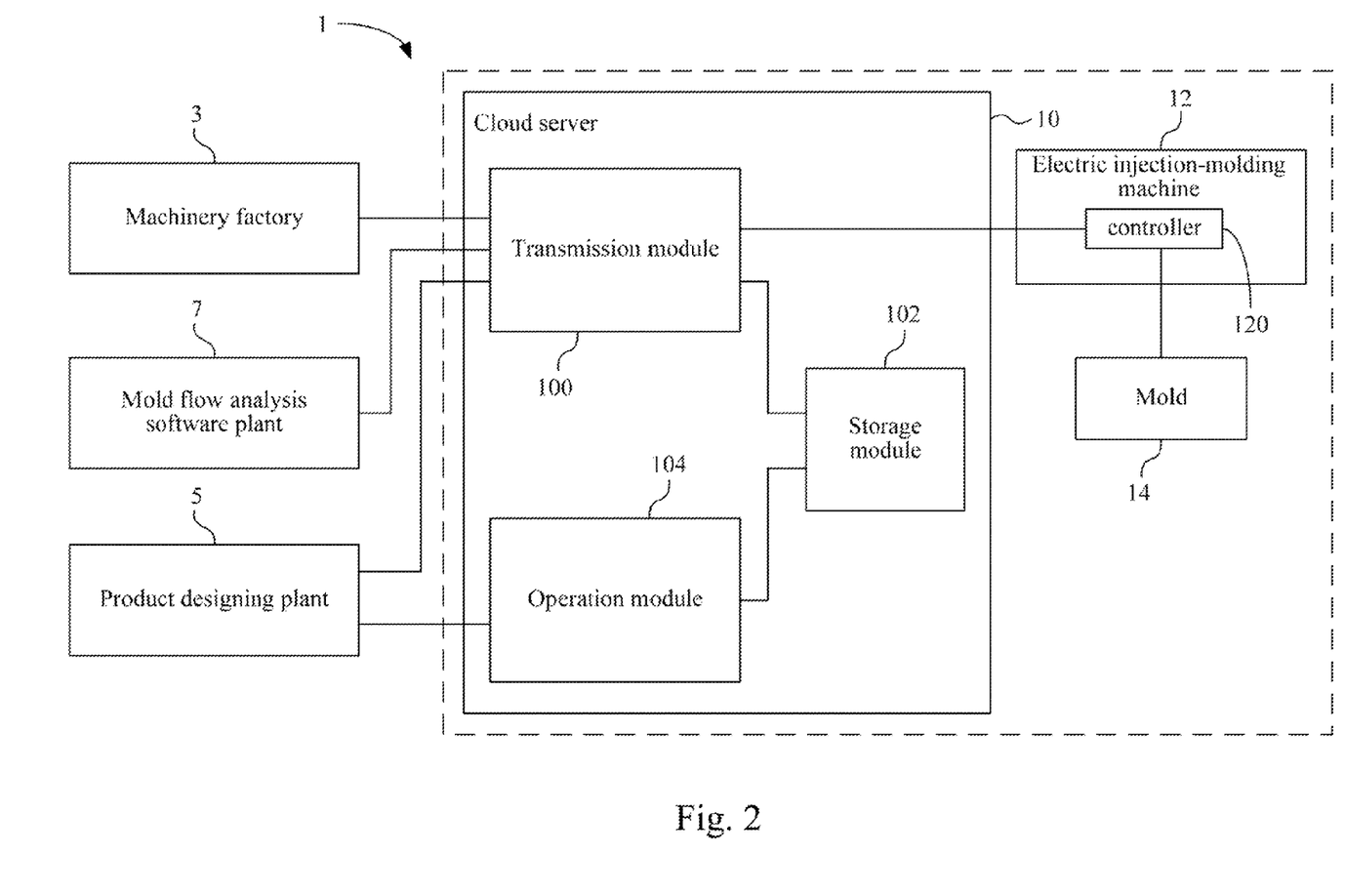
FIG. 2 is a detailed block diagram of the plastic product manufacturing system in FIG. 1.
Figure 3:
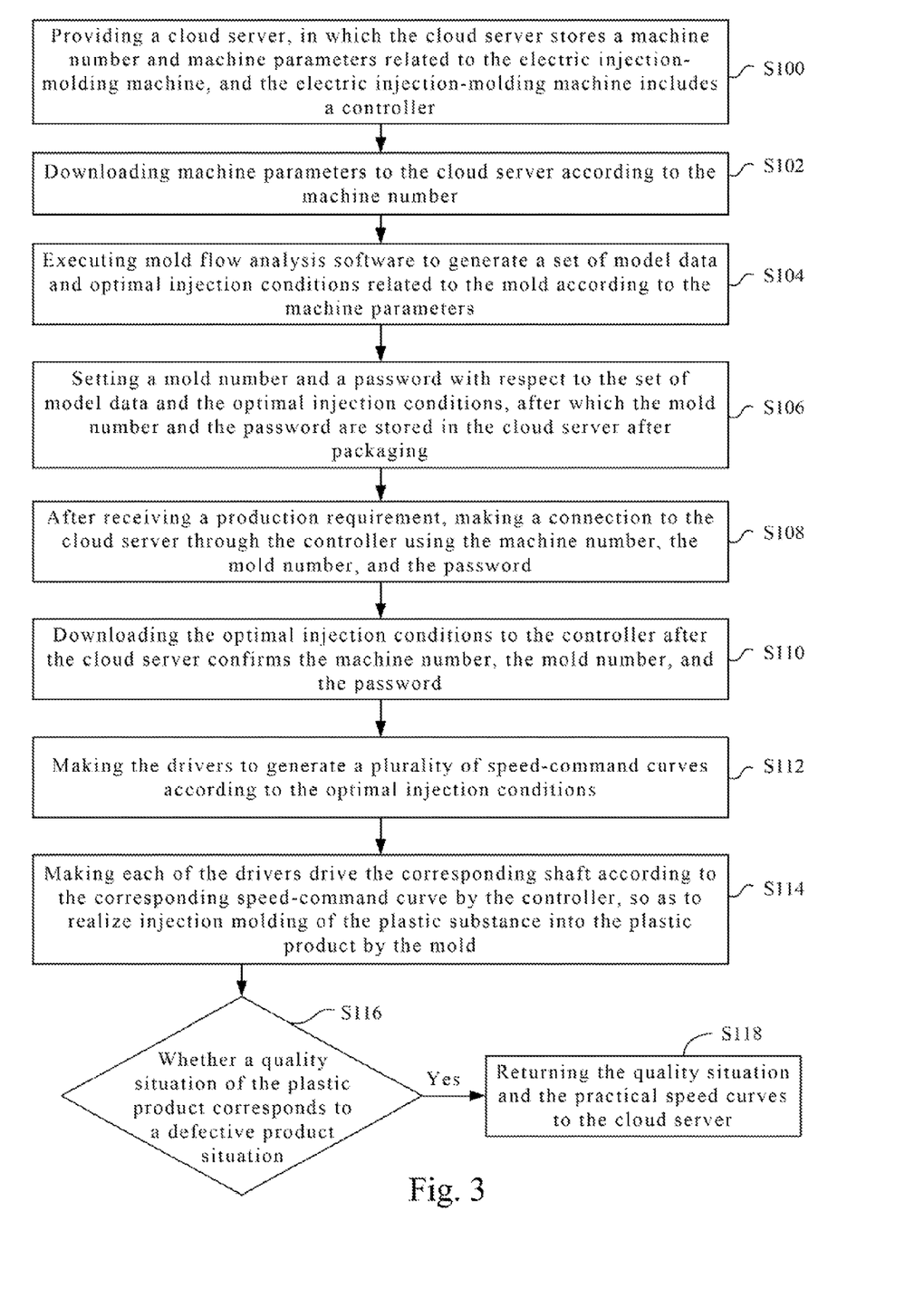
FIG. 3 is a flow chart of a plastic product manufacturing method according to an embodiment of the disclosure.

FIG. 2 is a detailed block diagram of the plastic product manufacturing system 1 in FIG. 1. FIG. 3 is a flow chart of a plastic product manufacturing method according to an embodiment of the disclosure.

A plastic product manufacturing method according to an embodiment of the present disclosure will now be described with reference to FIGS. 2 and 3.

In step S100, a cloud server 10 is provided, in which the cloud server 10 stores a machine number and machine parameters related to the all-electric injection-molding machine 12, and the all-electric injection-molding machine 12 includes a controller 120.

As shown in FIG. 2, the cloud server 10 of the plastic product manufacturing system 1 includes a transmission module 100, a storage module 102, and an operation module 104. The transmission module 100 of the cloud server 10 is capable of receiving the machine number and the machine parameters uploaded by the machinery factory 3, and storing the machine number and the machine parameters in the storage module 102 of the cloud server 10. The machine parameters correspond to the all-electric injection-molding machine 12. In an embodiment of the disclosure, the machine parameters include a machine tonnage parameter, an injection tube parameter, and a screw cross-sectional area parameter, but the disclosure is not limited in this regard.

As shown in FIG. 3, the plastic product manufacturing method further includes a number of steps as outlined below.

In step S102, the machine parameters are downloaded from the cloud server 10 according to the machine number.

In step S104, mold flow analysis software is executed to generate a set of model data and optimal injection conditions related to the mold 14 according to the machine parameters.

In step S106, a mold number and a password are set with respect to the set of model data and the optimal injection conditions, after which the mold number and the password are stored in the cloud server 10 after packaging.

With reference to FIG. 2, the product designing plant 5 is capable of downloading the machine parameters of the all-electric injection-molding machine 12 from the storage module 102 of the cloud server 10 to the operation module 104 of the cloud server 10 according to the machine number of the all-electric injection-molding machine 12. Afterwards, the product designing plant 5 is capable of executing the mold flow analysis software uploaded by the mold flow analysis software plant 7 to generate the set of model data and the optimal injection conditions related to the mold 14 according to the machine parameters by using the operation module 104.

It should be pointed out that the operation module 104 of the cloud server 10 is capable of executing the mold flow analysis software uploaded by the mold flow analysis software plant 7. Before manufacture, the mold flow analysis software is usually used to analyze the quality status of the mold 14. Therefore, in an example scenario, a designer in the product designing plant 5 can operate the mold flow analysis software to setup the set of model data according to the machine parameters and thus correspondingly generate the optimal injection conditions. Theoretically, the best quality will be obtained for the mold 14 manufactured according to the optimal injection conditions.

Finally, the product designing plant 5 is capable of setting the mold number and the password to the set of model data and the optimal injection conditions and then of storing the same in the storage module 102 of the cloud server 10 after packaging. That is, in the embodiment of the disclosure, the above-mentioned operations of the product designing plant 5 are all done in the cloud server 10 of the plastic product manufacturing system 1.

In an embodiment of the disclosure, the set of model data include a mold drawing parameter and a sprue parameter, but the disclosure is not limited in this regard.

It is noted that the above-mentioned operations of the product designing plant 5 are not necessarily done in the cloud server 10 of the plastic product manufacturing system 1. In another embodiment of the disclosure, the product designing plant 5 is capable of downloading the machine parameters of the all-electric injection-molding machine 12 from the storage module 102 of the cloud server 10 to a computer of the product designing plant 5 according to the machine number of the all-electric injection-molding machine 12. Afterwards, the product designing plant 5 is capable of executing the mold flow analysis software (installed in the computer of the product designing plant 5) provided by the mold flow analysis software plant 7 to generate the set of model data and the optimal injection conditions related to the mold 14 according to the machine parameters by using the operation module 104. Finally, the product designing plant 5 is capable of setting the mold number and the password to the set of model data and the optimal injection conditions and then storing the same in the storage module 102 of the cloud server 10 via the transmission module 100 of the cloud server 10 after packaged.

As shown in FIG. 3, the plastic product manufacturing method further includes a number of steps.

In step S108, after receiving a production requirement, a connection is made to the cloud server 10 through the controller 120 using the machine number, the mold number, and the password.

In step S110, the optimal injection conditions are downloaded to the controller 120 after the cloud server 10 confirms the machine number, the mold number, and the password.

With reference to FIG. 2, in the embodiment of the disclosure, after users of injection molding plants receive the production requirement of the product designing plant 5, the product designing plant 5 will inform the users of the injection molding plants the machine number of the adopted all-electric injection-molding machine 12, the mold number of the mold 14, and the password set up by the product designing plant 5. Accordingly, the users of the injection molding plants can connect to the cloud server 10 through the controller 120 of the all-electric injection-molding machine 12 using the machine number, the mold number, and the password. After the cloud server 10 confirms that the machine number, the mold number, and the password are without error, the cloud server 10 can allow the optimal injection conditions to be downloaded to the controller 120 of the all-electric injection-molding machine 12.

In an embodiment of the disclosure, the optimal injection conditions generated by the mold flow analysis software include an optimal temperature value, an optimal injection speed value, and an optimal pressure value, and can be presented in the form of a look-up table, but the disclosure is not limited in this regard.

Figure 4:
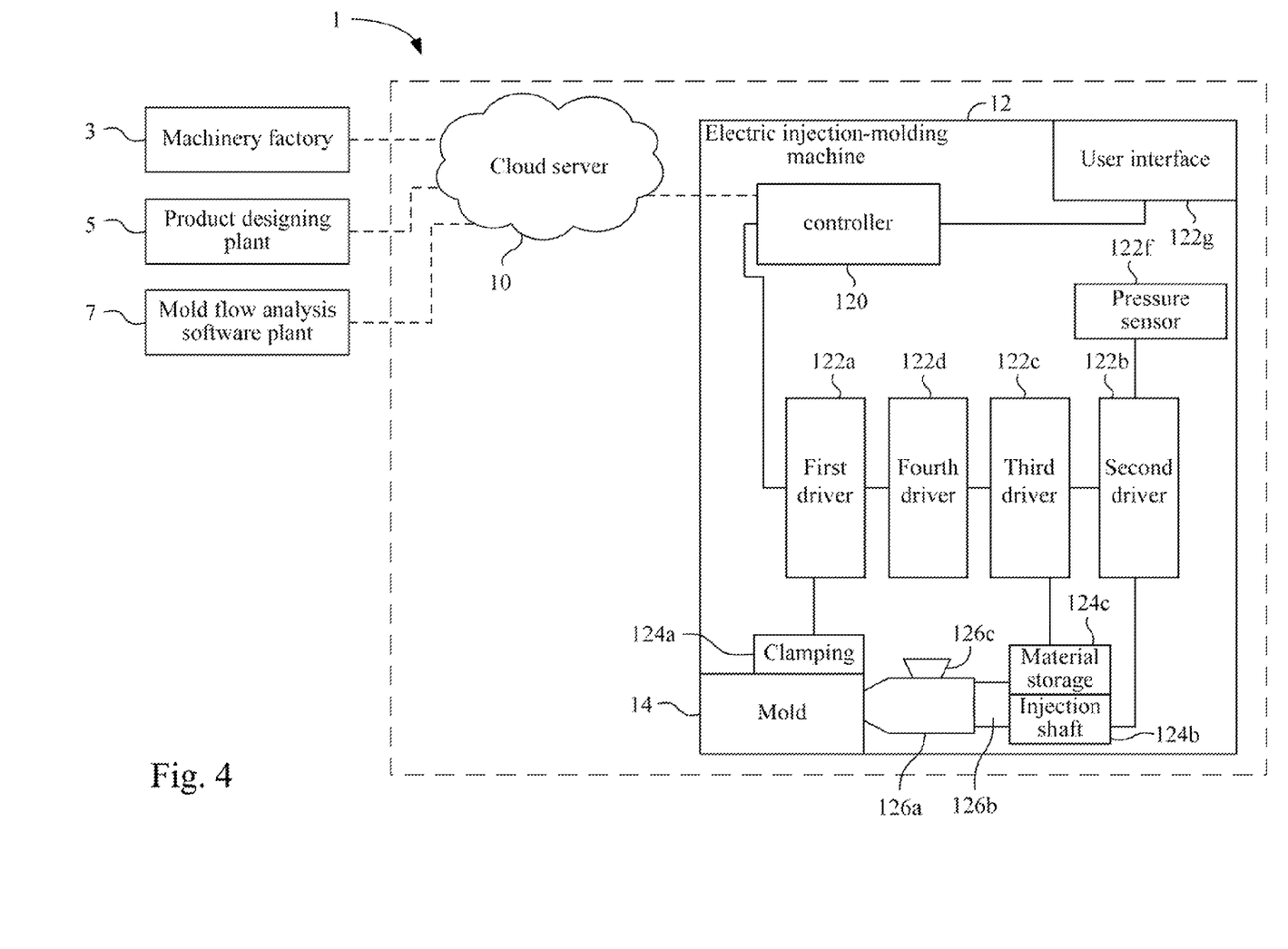
FIG. 4 is another detailed block diagram of the plastic product manufacturing system in FIG. 1.

FIG. 4 is another detailed block diagram of the plastic product manufacturing system 1 in FIG. 1.

As shown in FIG. 4, the all-electric injection-molding machine 12 of the plastic product manufacturing system 1 includes a plurality of shafts, a plurality of drivers, and the controller 120. The shafts are operatively connected to the mold 14. Components included in the all-electric injection-molding machine 12 are only simply described here. Detailed descriptions of the shafts, the drivers, and the controller 120 of the all-electric injection-molding machine 12 are provided below with reference to FIG. 4.

As shown in FIG. 3, the plastic product manufacturing method further includes a number of steps.

In step S112, the drivers are made to generate a plurality of speed-command curves according to the optimal injection conditions.

In step S114, the controller 120 makes each of the drivers drive the corresponding shaft according to the corresponding speed-command curve, so as to realize injection molding of the plastic substance into the plastic product by the mold 14.

In other words, each of the drivers in the all-electric injection-molding machine 12 is capable of generating a corresponding speed-command curve according to the optimal injection conditions. Therefore, the all-electric injection-molding machine 12 can make each of the drivers drive the corresponding shaft according to the corresponding speed-command curve through the controller 120, so as to realize injection molding of the plastic substance into the plastic product by the mold 14.

It should be pointed out that the controller 120 of the all-electric injection-molding machine 12 and content stored in the storage module 102 of the cloud server 10 are collocated with each other. For the controller 120 of the all-electric injection-molding machine 12, the storage module 102 of the cloud server 10 acts as a remote drive disk requiring a password. For the machinery factory 3, the storage module 102 of the cloud server 10 can be a public remote drive disk. For the product designing plant 5, the optimal injection conditions, which may involve product secrets, must be stored with a more robust security mechanism, so that is becomes unnecessary to store detailed model data (such as the source of the mold drawing parameter) in the storage module 102 of the cloud server 10. However, the thumbnail of the mold 14, which has undergone processing, can be stored in the storage module 102 of the cloud server 10, thereby providing convenience for the mold flow analysis software plant 7 with respect to analyzing and diagnosing problems.

With reference to FIG. 3, when each of the drivers of the all-electric injection-molding machine 12 drives the corresponding shaft according to the corresponding speed-command curve, each of the shafts actually has a corresponding practical speed curve. The plastic product manufacturing method further includes a number of steps.

In step S116, a determination is made as to whether a quality situation of the plastic product corresponds to a defective product situation.

If the result of step S116 is positive, then according to the plastic product manufacturing method of the disclosure, step S118 is performed.

In step S118, the quality situation and the practical speed curves are returned to the cloud server 10.

That is, after each of the drivers of the all-electric injection-molding machine 12 drives the corresponding shaft according to the corresponding speed-command curve so as to injection mold the plastic substance into the plastic product through the mold 14, if the plastic product has unacceptable differences in quality, the plastic product will be determined to be defective, and the defective product situation and the practical speed curves of the plastic product will then be returned to the transmission module 100 of the cloud server 10. Afterwards, the transmission module 100 of the cloud server 10 returns the defective product situation and the practical speed curves of the plastic product to the mold flow analysis software plant 7 to allow analysis and diagnosis, and allow the mold flow analysis software plant 7 to provide suggestions.

As shown in FIG. 4, the all-electric injection-molding machine 12 of the plastic product manufacturing system 1 cooperates with the cloud server 10 and includes a clamping shaft 124a, a cylinder body 126a, a screw 126b, a material storage filler 126c, an injection shaft 124b, a material storage shaft 124c, the controller 120, a first driver 122a, a second driver 122b, a third driver 122c, a fourth driver 122d, and a user interface 122g. The clamping shaft 124a of the all-electric injection-molding machine 12 is operatively connected to the mold 14 and is used for opening or closing the mold 14. The cylinder body 126a of the all-electric injection-molding machine 12 is communicated with the mold 14 and is used for accommodating the plastic substance. The screw 126b of the all-electric injection-molding machine 12 is slidably and rotatably disposed in the cylinder body 126a. The injection shaft 124b of the all-electric injection-molding machine 12 is operatively connected to the screw 126b and is used for driving the screw 126b to slide relative to the cylinder body 126a. The material storage shaft 124c of the all-electric injection-molding machine 12 is operatively connected to the screw 126b and is used for driving the screw 126b to rotate relative to the cylinder body 126a.

The controller 120 of the all-electric injection-molding machine 12 is capable of downloading the optimal injection conditions from the transmission module 100 of the cloud server 10 according to the machine number related to the all-electric injection-molding machine 12, the mold number related to the mold 14, and the password set up by the product designing plant 5. In an embodiment of the disclosure, the speed-command curves generated by the above-mentioned drivers according to the optimal injection conditions include an opening mold speed-command curve, a closing mold speed-command curve, an injection speed-command curve, and a storing material speed-command curve, but the disclosure is not limited in this regard. The first driver 122a of the all-electric injection-molding machine 12 is used for generating the opening mold speed-command curve and the closing mold speed-command curve according to the optimal injection conditions, and is capable of driving the clamping shaft 124a to open and close the mold 14 respectively according to the opening mold speed-command curve and the closing mold speed-command curve. The second driver 122b of the all-electric injection-molding machine 12 is used for generating the injection speed-command curve and the storing material speed-command curve according to the optimal injection conditions. The second driver 122b is capable of driving the injection shaft 124b to move the screw 126b toward the mold 14 so as to inject the plastic substance into the mold 14 according to the injection speed-command curve at an injection stage, and driving the injection shaft 124b to move the screw 126b away from the mold 14 according to the storing material speed-command curve at a material storage stage. The third driver 122c of the all-electric injection-molding machine 12 is used for driving the material storage shaft 124c to actuate the screw 126b to push the plastic substance outside of the cylinder body 126a into the cylinder body 126a at the material storage stage (i.e., the plastic substance is pushed from the material storage filler 126c). The user interface 122g of the all-electric injection-molding machine 12 can include a display and a keyboard (not shown), so that operators can control and maintain the all-electric injection-molding machine 12 via the user interface 122g.

Furthermore, the fourth driver 122d of the all-electric injection-molding machine 12 is operatively connected to an ejection shaft (not shown) and is used for ejecting the plastic product from the opened mold 14 after injection molding.

Accordingly, after the all-electric injection-molding machine 12 of the plastic product manufacturing system 1 transmits each of the speed-command curves to the corresponding driver by the controller 120, the drivers can perform their duties. After booting, the controller 120 of the all-electric injection-molding machine 12 pre-heats a feeding tube and closes the mold 14. After the temperature of the feeding tube reaches a setting value, the controller 120 of the all-electric injection-molding machine 12 executes processes such as storing material, injecting air, moving an injection base forward, etc. Afterwards, the controller 120 of the all-electric injection-molding machine 12 executes the circulation of processes of injecting, pressure maintaining, storing material, opening mold 14, and ejecting.

Figure 5A:
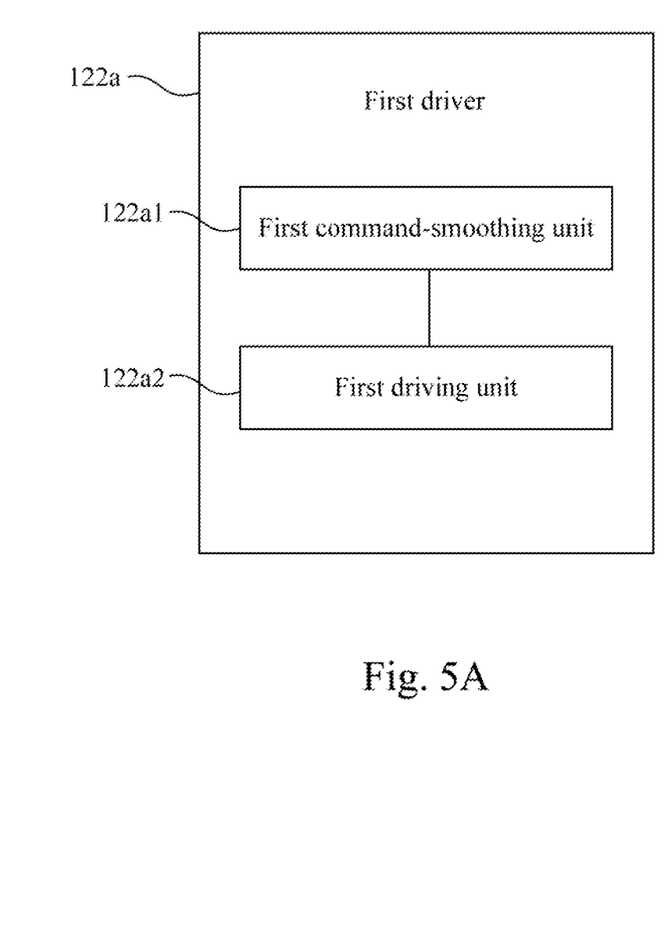
FIG. 5A is a detailed block diagram of a first driver in FIG. 4.

FIG. 5A is a detailed block diagram of a first driver 122*a* in FIG. 4.

As shown in FIG. 5A, the first driver 122*a* of the all-electric injection-molding machine 12 includes a first command-smoothing unit 122*a*1 and a first driving unit 122*a*2. The first command-smoothing unit 122*a*1 of the first driver 122*a* is used for smoothing the injection speed-command curve and the closing mold speed-command curve. The first driving unit 122*a*2 of the first driver 122*a* is used for driving the clamping shaft 124*a* to close and open the mold 14 respectively according to the smoothed opening mold speed-command curve and the smoothed closing mold speed-command curve. That is, a corresponding speed of a position of the clamping shaft 124*a* relative to the mold 14 can he obtained from the opening mold speed-command curve and the closing mold speed-command curve.

In an embodiment of the disclosure, the first driver 122*a* of the all-electric injection-molding machine 12 can further take torque protection limit values into account so as to ensure the best efficiency of closing the mold 14. Furthermore, during the closing of the mold 14, the first driver 122*a* of the all-electric injection-molding machine 12 returns stage status values in every constant time interval. The controller 120 of the all-electric injection-molding machine 12 will determine whether problems occur with respect to the clamping of the mold 14 according to the stage status values. During the opening of the mold 14, it is unnecessary to consider meshing of the mold 14, and it is necessary only that the mold 14 be opened during a shortest time interval in a state where the surface of the plastic product is not damaged.

Figure 5B:
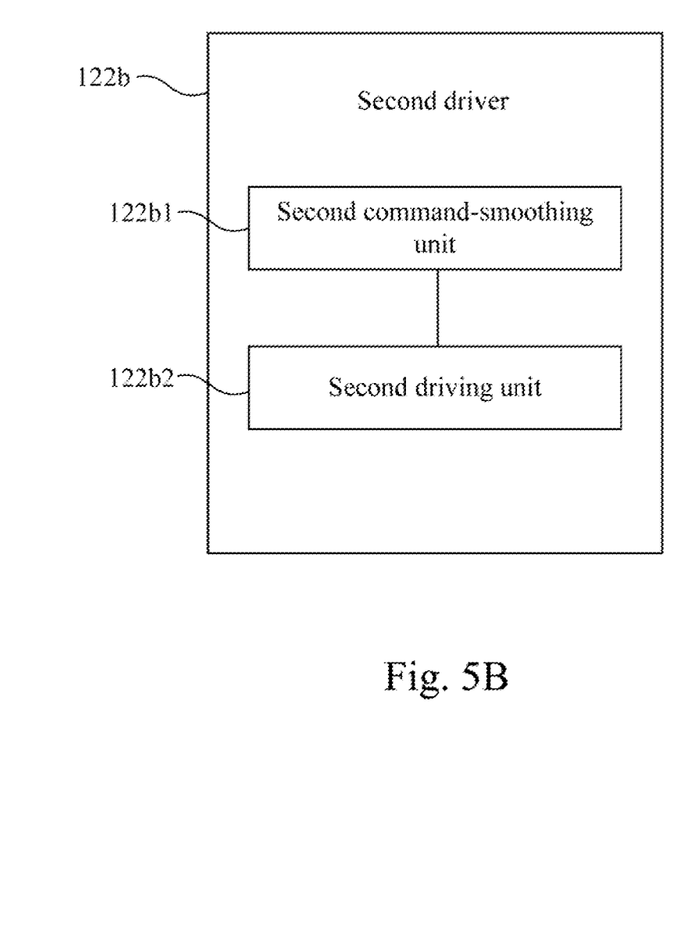
FIG. 5B is a detailed block diagram of a second driver in FIG. 4.

FIG. 5B is a detailed block diagram of a second driver 122*b* in FIG. 4.

As shown in FIG. 5B, the second driver 122*b* of the all-electric injection-molding machine 12 includes a second command-smoothing unit 122*b*1 and a second driving unit 122*b*2. The second command-smoothing unit 122*b*1 of the second driver 122*b* is used for smoothing the opening mold speed-command curve and the storing material speed-command curve. The second driving unit 122*b*2 of the second driver 122*b* is used for driving the injection shaft 124*b* to move the screw 126*b* toward the mold 14 according to the smoothed injection speed-command curve, and driving the injection shaft 124*b* to move the screw 126*b* away from the mold 14 according to the smoothed storing material speed-command curve.

Furthermore, as shown in FIG. 4, the controller 120 of the all-electric injection-molding machine 12 further downloads a backpressure command curve from the transmission module 100 of the cloud server 10. The backpressure command curve can also be generated by the mold flow analysis software and be stored in the storage module 102. The screw 126*b* of the all-electric injection-molding machine 12 has a corresponding backpressure limitation value at any position relative to the mold 14 according to the backpressure command curve. The all-electric injection-molding machine 12 further includes a pressure sensor 122*f*. The pressure sensor 122*f* of the all-electric injection-molding machine 12 is operatively connected to the screw 126*b* and is used for sensing an actual backpressure value related to the screw 126*b*.

In general, the injection stage includes two sub-stages. The first sub-stage of the injection stage is "injection," and the second sub-stage of the injection stage is "pressure maintaining." During the first sub-stage (i.e., injection) of the injection stage, the second driver 122*b* of the all-electric injection-molding machine 12 drives the injection shaft 124*b* to move the screw 126*b* toward the mold 14 according to the injection speed-command curve and the backpressure command curve when the actual backpressure value is larger than the backpressure limitation value. On the other hand, when the actual backpressure value does not exceed the backpressure limitation value, the second driver 122*b* of the all-electric injection-molding machine 12 drives the injection shaft 124*b* to move the screw 126*b* toward the mold 14 simply according to the injection speed-command curve.

The purpose of the second sub-stage (i.e., pressure maintaining) of the injection stage is to maintain the actual backpressure value. The manner in which the actual backpressure value is maintained involves a determination made on the basis of the actual backpressure value transmitted by the pressure sensor 122*f*. When the actual backpressure value transmitted by the pressure sensor 122*f* increases, the second driver 122*b* of the all-electric injection-molding machine 12 drives the injection shaft 124*b* to move the screw 126*b* away from the mold 14. On the other hand, when the actual backpressure value transmitted by the pressure sensor 122*f* decreases, the second driver 122*b* of the all-electric injection-molding machine 12 drives the injection shaft 124*b* to move the screw 126*b* toward the mold 14. In general, the backpressure value mostly needs to be increased during the second sub-state of the injection stage because the plastic substance will contract after cooling, making the actual backpressure value continuously decrease.

Furthermore, during the material storage stage, the injection shaft 124*b* and the material storage shaft 124*c* must operate simultaneously, and the purpose of the material storage stage is similar to the purpose of the second sub-stage of the injection stage. Similarly, the manner in which the actual backpressure value is maintained involves a determination made on the basis of the actual backpressure value transmitted by the pressure sensor 122*f*. The second driver 122*b* of the all-electric injection-molding machine 12 drives the injection shaft 124*b* to pull back the screw 126*b*, and the third driver 122*c* drives the material storage shaft 124*c* to push the plastic substance into the cylinder body 126*a* from the material storage filler 126*c*, so as to maintain enough backpressure to ensure the density of the plastic substance.

When the actual backpressure value transmitted by the pressure sensor 122*f* increases, the third driver 122*c* of the ail-electric injection-molding machine 12 drives the material storage shaft 124*c* to decrease the rotational speed of the screw 126*b*. On the other hand, when the actual backpressure value transmitted by the pressure sensor 122*f* decreases, the third driver 122*c* of the all-electric injection-molding machine 12 drives the material storage shaft 124*c* to increase the rotational speed of the screw 126*b*.

During operation, the third driver 122*c* that drives the material storage shaft 124*c* only needs to monitor the actual backpressure value transmitted by the pressure sensor 122*f*.

The second driver 122b that drives the injection shaft 124b can interact with the third driver 122c without the controller 120, as long as the backpressure error and the speed error are returned to the controller 120 in every constant time interval. In summary, the controller 120 of the all-electric injection-molding machine 12 of the disclosure only needs to decide which one of the drivers to be started without having to be responsible for all of the drivers as in the past. Accordingly, the all-electric injection-molding machine 12 of the disclosure can achieve a decentralized control architecture, thus reducing the burden on the controller 120.

According to the foregoing recitations of the embodiments of the disclosure, it can be seen that the plastic product manufacturing method integrates expert system architectures in upstream and downstream ends (such as machinery factories, product designing plants, mold flow analysis software plants, etc.) by using a cloud server, so as to integrate the best manufacturing solution of a plastic product in the cloud. Furthermore, a controller of an all-electric injection-molding machine can obtain the best manufacturing solution of a plastic product from the cloud server. Therefore, the schedule of the all-electric injection-molding machine can be reduced, and experience of setting and adjusting the machine can be systematically stored and utilized. As a result, the loss of experienced technicians does not adversely affect manufacture, and the quality of the plastic product can be optimized. Moreover, the controller of the all-electric injection-molding machine is only responsible for implementations of human-machine interface and program logic (PLC). After mold and speed-command curves have been determined, the controller transmits the speed-command curves to low-level drivers. In each stage, the controller only transmits starting commands corresponding to the stage to the drivers, and then the drivers operate according to the transmitted speed-command curves respectively. The controller only monitors whether all protection switches are triggered to determine follow-up actions, and monitors whether the drivers have accomplished tasks of current stage to determine the starting of the next stage. After receiving the corresponding speed-command curve, each of the drivers drives the corresponding shaft and returns a system state back to the controller. Accordingly, the all-electric injection-molding machine of the disclosure can achieve a decentralized control architecture, thus reducing the burden on the controller.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A plastic product manufacturing method comprising:
   (a) providing a cloud server, wherein the cloud server comprises a storage module and an operation module, the storage module stores a machine number and machine parameters related to an all-electric injection-molding machine, and the all-electric injection-molding machine includes a controller;
   (b) downloading the machine parameters from the storage module to the operation module according to the machine number;
   (c) executing mold flow analysis software by the operation module to generate a set of model data and optimal injection conditions related to a mold according to the machine parameters;
   (d) setting a mold number and a password to the set of model data and the optimal injection conditions and then storing the mold number and the password in the storage module after packaging by the operation module;
   (e) connecting to the cloud server using the machine number, the mold number, and the password by the controller after receiving a production requirement;
   (f) downloading the optimal injection conditions to the controller after the cloud server confirms the machine number, the mold number, and the password; and
   (g) driving the all-electric injection-molding machine by the controller according to the optimal injection conditions, so as to injection mold a plastic substance into a plastic product.

2. The plastic product manufacturing method of claim 1, wherein the all-electric injection-molding machine comprises a plurality of shafts and a plurality of drivers, and step (g) comprises:
   (g1) making the drivers generate a plurality of speed-command curves according to the optimal injection conditions; and
   (g2) making each of the drivers drive the corresponding shaft according to the corresponding speed-command curve by the controller, so as to injection mold the plastic substance into the plastic product by the mold.

3. The plastic product manufacturing method of claim 2, wherein when the drivers drive the shafts according to the speed-command curves, each of the shafts has a corresponding practical speed curve, and the plastic product manufacturing method further comprises:
   (h) determining whether a quality situation of the plastic product corresponds to a defective product situation, and if it does, performing step (i); and
   (i) returning the quality situation and the practical speed curves to the cloud server.

4. The plastic product manufacturing method of claim 1, wherein the machine parameters comprise a machine tonnage parameter, an injection tube parameter, and a screw cross-sectional area parameter.

5. The plastic product manufacturing method of claim 1, wherein the set of model data comprise a mold drawing parameter and a sprue parameter.

6. The plastic product manufacturing method of claim 1, wherein the optimal injection conditions comprise an optimal temperature value, an optimal injection speed value, and an optimal pressure value.

7. An all-electric injection-molding machine for injecting a plastic substance into a mold, the all-electric injection-molding machine cooperating with a cloud server and comprising:
   a clamping shaft, operatively connected to the mold, for opening or closing the mold;
   a cylinder body, communicated with the mold, for accommodating the plastic substance;
   a screw slidably and rotatably disposed in the cylinder body;
   an injection shaft, operatively connected to the screw, for driving the screw to slide relative to the cylinder body;
   a material storage shaft, operatively connected to the screw, for driving the screw to rotate relative to the cylinder body;
   a controller for downloading optimal injection conditions from the cloud server according to a machine number related to the all-electric injection-molding machine, a mold number related to the mold, and a password;
   a first driver for generating an opening mold speed-command curve and a closing mold speed-command curve according to the optimal injection conditions, wherein the first driver is capable of driving the clamping shaft to open and close the mold respectively according to the opening mold speed-command curve and the closing mold speed-command curve;
a second driver for generating an injection speed-command curve and a storing material speed-command curve according to the optimal injection conditions, wherein the second driver is capable of driving the injection shaft to move the screw toward the mold so as to inject the plastic substance into the mold according to the injection speed-command curve at an injection stage, and driving the injection shaft to move the screw away from the mold according to the storing material speed-command curve at a material storage stage; and
a third driver for driving the material storage shaft to actuate the screw to push the plastic substance outside of the cylinder body into the cylinder body at the material storage stage.

8. The all-electric injection-molding machine of claim 7, wherein the first driver comprises:
a first command-smoothing unit for smoothing the injection speed-command curve and the closing mold speed-command curve; and
a first driving unit for driving the clamping shaft to close and open the mold respectively according to the smoothed opening mold speed-command curve and the smoothed closing mold speed-command curve.

9. The all-electric injection-molding machine of claim 7, wherein the second driver comprises:
a second command-smoothing unit for smoothing the opening mold speed-command curve and the storing material speed-command curve; and
a second driving unit for driving the injection shaft to move the screw toward the mold according to the smoothed injection speed-command curve, and driving the injection shaft to move the screw away from the mold according to the smoothed storing material speed-command curve.

10. The all-electric injection-molding machine of claim 7, wherein the controller further downloads a backpressure command curve from the cloud server, the screw has a corresponding backpressure limitation value at any position relative to the mold according to the backpressure command curve, the all-electric injection-molding machine further comprises a pressure sensor, operatively connected to the screw, for sensing a actual backpressure value related to the screw, and the second driver drives the injection shaft to move the screw toward the mold according to the injection speed-command curve and the backpressure command curve when the actual backpressure value is larger than the backpressure limitation value, and drives the injection shaft to move the screw away from the mold according to the storing material speed-command curve and the backpressure command curve.

* * * * *